3,525,874
TURBINE AND ELECTRIC POWERED VEHICLE
William W. Toy, Bloomfield Hills, Mich., assignor of fifty percent to Lewis G. Harmon, Birmingham, Mich.
Filed Apr. 22, 1968, Ser. No. 722,962
Int. Cl. B60l 11/12
U.S. Cl. 290—14     4 Claims

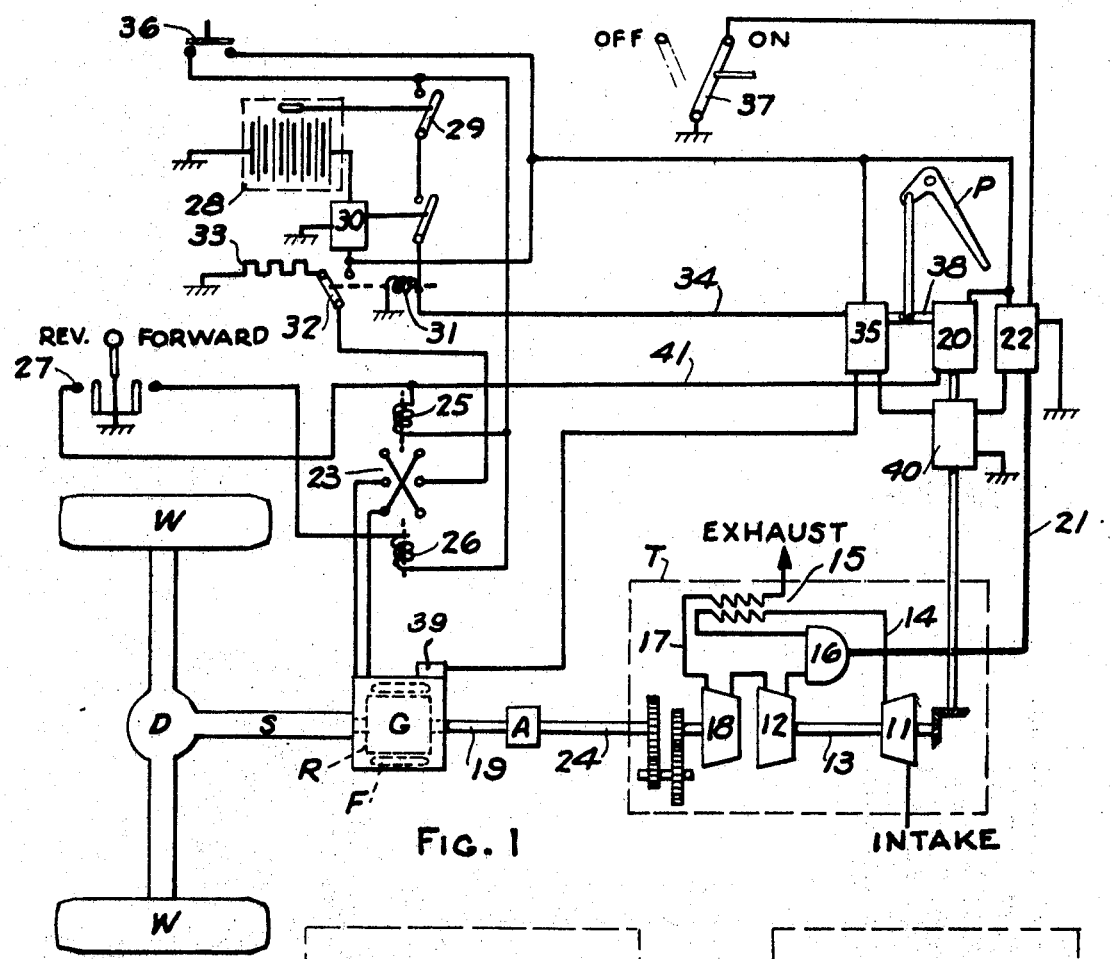
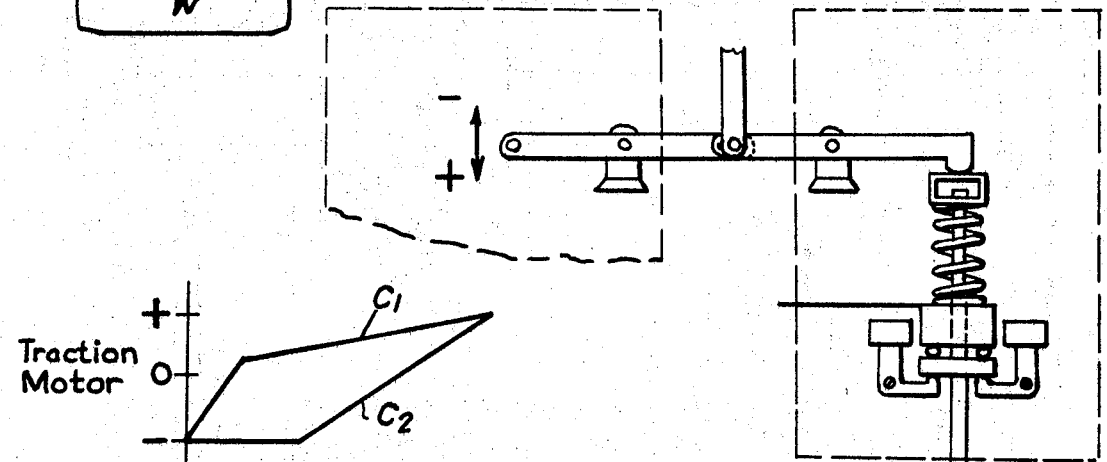
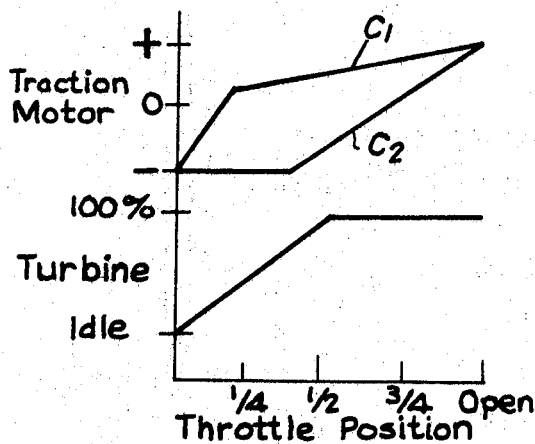
FIG. 1
FIG. 2
FIG. 3
INVENTOR.
WILLIAM W. TOY
ATTORNEYS United States Patent Office 3,525,874
Patented Aug. 25, 1970

ABSTRACT OF THE DISCLOSURE

A combined turbine and electric drive for a vehicle which includes a turbine engine, a clutch driven by the turbine engine, and a motor-generator connected to the clutch and the vehicle wheels. The vehicle is driven by the turbine engine or is driven electrically by the motor-generator in the motor mode or by both.

This invention relates to vehicles and particularly to a drive system for vehicles.

Among the objects of the invention are to provide a combined turbine engine and electric drive for a vehicle wherein the electric drive can be utilized for maximum performance at startup and low speeds and the turbine engine drive can be utilized for maximum performance at higher speeds; which system utilizes a motor-generator that is used to drive the vehicle electrically or to charge the energy source when the vehicle is driven by the turbine engine; which utilizes a novel system for automatically controlling the operation of the turbine engine in conjunction with the electric drive; which provides a power plant with low exhaust pollutant emission when operated as a turbine engine car and zero pollution when operated electrically in congested areas; which provides an electric vehicle with extended range capability due to the recharging of the battery by operation of the turbine engine; and which can also be used as a source of emergency electric power.

In the drawings:

FIG. 1 is a part sectional diagrammatic view of a gas turbine engine and electric vehicle drive system embodying the invention.

FIG. 2 is a schematic drawing of the traction motor control and turbine engine fuel control combination.

FIG. 3 is a graphical representation of the throttle position relative to the traction motor control and turbine engine speed control.

Referring to FIG. 1, the system embodying the invention comprises a turbine engine T which drives a clutch A that, in turn, drives a motor-generator G which, in turn, drives a shaft S extending to a differential D for driving the driven wheels W of the vehicle.

The motor-generator G is of the traction motor type, such as a series wound type, and comprises a stator F and a rotor R, the rotor being directly connected to the clutch as presently described and to the shaft S.

Referring to FIG. 1, turbine engine T comprises a conventional two-shaft free turbine engine which includes a compressor 11 and a first turbine 12 that preferably have their rotors directly connected as by a single shaft 13. The compressed air from the compressor 11 flows through a line 14 forming a part of heat exchanger 15 to the combustor 16 of the turbine. The exhaust gases from the first turbine 12 flow through a second turbine 18 and through a line 17 adjacent line 14 of the heat exchanger.

As shown in FIG. 1, the output of the second turbine 18 is connected to the input of clutch A. Clutch A is preferably of the overrunning type. The output of clutch A is connected to the shaft of rotor R of the motor generator G. A variable ratio transmission may be installed between the turbine engine T and clutch A in order to provide greater torque over the range of operating speeds chosen for the vehicle than that provided by the electric motor and the straight line output torque vs. speed characteristics of the free turbine engine.

The motor-generator field of the stator F of the motor-generator G is selectively energized for forward and reverse drive by a two-position switch 23 which is controlled by solenoids 26, 25. A hand-operated forward and reverse switch 27 selectively controls the energization of solenoids 26, 25. Power for driving the motor-generator in the motor mode is received from an energy source 28 such as a battery.

Suitable controls are provided to prevent abusing the battery 28 by overcharging. A switch 29 responsive to battery temperature is provided for disconnecting the battery 28 from the traction motor-generator G in the event of a thermal runaway or overt-emperature of the battery. A battery analyzer 30 which is positioned to sense both current flow in the battery circuit and the voltage across the battery, provides for disconnecting the battery from the traction motor-generator G when the battery charge reaches a predetermined point. When either sensing device 29 or 30 acts to disconnect the battery, a re-energizing relay 31 moves a switch 32 to connect traction motor G to a resistance 33 which absorbs the energy of regenerative braking and dissipates it as heat. A line 34 signals traction motor control unit 35 of the battery disconnection and the motor control unit 35 schedule is changed. This prevents the regenerative braking feature from dissipating power through the resistance 33 while the turbine is running and acting as a propulsion unit.

An important feature of the system proposed is, that the traction motor G, when acting as a generator, provides rapid charging of the battery 28 thereby minimizing the time it will be necessary to operate the turbine engine for recharge of the battery during moderately slow driving. For fast freeway driving the battery 28 is soon charged, and on demand the circuit reverts to dynamic resistance braking in resistance 33 and the vehicle performs as a turbine propelled car at high speeds receiving little if any of its power from the traction motor G.

OPERATION

The vehicle is made ready for use by closing the ignition switch 36. With the gas turbine engine switch 37 in the off position, the vehicle functions as an electric battery powered vehicle. It can be charged from the electric utility power while standing still. To drive, the forward-reverse switch 27 is placed in the appropriate position. This pulls in one of the solenoids 25 or 26. Solenoids 25 and 26 position switch 23 to arrange the traction motor field coils for either forward or reverse operation. The speed and acceleration is adjusted with the foot pedal P which positions an input lever 38 to adjust the mechanical input signal to the traction motor control unit 35. Unit 39 controls the current flow to the motor-generator G and current in the motor field.

In order to start the turbine engine, the control 27 is in neutral position, the operator places the on-off control 37 in the "on" position which actuates the sequencing control 22 and energizes a starting motor 40 to start the turbine engine in accordance with well-known practice. The turbine engine can also be started with control lever 27 in the forward or reverse position. Line 41 signals turbine governor control unit 20 to idle position when reverse position R is chosen for lever 27.

In any position of the fuel control unit 20, fuel will be fed through the line 21 to the combustor 16 of the gas turbine. There will be a tendency to creep when the free turbine engine is at idle. This effect is overcome by braking. The electric motor provides vehicle propulsion while the free turbine gas generator spool is accelerating from idle to a speed sufficient to produce effective vehicle power. In order to transmit torque, the control 27 is moved to the forward position.

FIG. 3 is a schematic diagram showing the throttle position relative to traction motor control and turbine engine speed control, the lower curve showing the turbine engine speed and the upper curves showing the relationship of the traction motor operation to throttle position, the minus sign indicating regenerative braking or generator operation and the plus sign indicating motor operation. As seen by these curves, as long as the battery is not fully charged, the traction motor-generator will follow the curve $C_2$. However, if due to operation of the turbine engine the battery is fully charged, the motor-generator will follow curve $C_1$.

I claim:
1. In a vehicle drive system the combination comprising:
   a vehicle having at least one driven ground engaging wheel,
   a free turbine engine having a combustor, a compressor, a first turbine having a rotor and a stator, and a second turbine having a rotor and a stator, said rotor of said first turbine being drivingly connected to said compressor; said rotor of said second turbine being fluidly driven by said first turbine and having an output shaft,
   an automatic overrunning clutch device between said turbine engine and said driven wheel,
   said clutch having an input shaft and an output shaft which is driven upon rotation of said input shaft,
   said input shaft of said clutch being drivingly connected to said output shaft of said rotor of said second turbine,
   a motor-generator connected to a source of energy and including a stator and a rotor,
   said rotor being connected to the output shaft of said clutch and to the driven wheel of the vehicle, and
   means automatically responsive to load conditions to vary the output of said motor-generator relative to said turbine engine.

2. The combination set forth in claim 1 including means for electrically connecting said energy source and said motor-generator for operating said motor-generator as a motor,
   and means for de-energizing said last-mentioned means and actuating said turbine to reverse the operation of the motor-generator so that it operates as a generator to supply current to the energy source.

3. The combination set forth in claim 1 including a differential interposed between said clutch and said driven wheel.

4. The combination set forth in claim 1, said load condition responsive means including means for controlling the supply of fuel to said turbine and for controlling the supply of electrical power to said motor-generator such that when said means is positioned for acceleration said motor-generator is operated as a motor and fuel is supplied to said turbine to bring said turbine up to the desired speed and wherein thereafter said means is positioned for the operating speed, said motor-generator is operated as a generator.

References Cited
UNITED STATES PATENTS

| | | | |
|---|---|---|---|
| 1,951,089 | 3/1934 | Fielder | 290—14 XR |
| 2,472,924 | 6/1949 | Schwendner | 290—17 |
| 2,581,596 | 1/1952 | Nims | 290—14 XR |
| 3,205,965 | 9/1965 | Roth. | |
| 3,211,249 | 10/1965 | Papst. | |

G. R. SIMMONS, Primary Examiner

U.S. Cl. X.R.
180—65; 290—16, 17; 318—138